(12) United States Patent
Gadkaree et al.

(10) Patent No.: US 8,198,210 B2
(45) Date of Patent: Jun. 12, 2012

(54) HALOGENATED ACTIVATED CARBON MATERIALS FOR HIGH ENERGY DENSITY ULTRACAPACITORS

(75) Inventors: Kishor Purushottam Gadkaree, Painted Post, NY (US); Shrisudersan Jayaraman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 140 days.

(21) Appl. No.: 12/788,478

(22) Filed: May 27, 2010

(65) Prior Publication Data

US 2011/0294661 A1    Dec. 1, 2011

(51) Int. Cl.
  *C01B 31/08* (2006.01)
(52) U.S. Cl. .................................. 502/417; 502/423
(58) Field of Classification Search .................. 502/417, 502/423
  See application file for complete search history.

(56) References Cited

U.S. PATENT DOCUMENTS

| | | | | |
|---|---|---|---|---|
| 5,639,577 | A | 6/1997 | Takeuchi et al. | 429/219 |
| 5,948,329 | A | 9/1999 | Ohsaki et al. | 264/29.4 |
| 6,013,208 | A | 1/2000 | Nakamura et al. | 264/29.4 |
| 6,692,871 | B2 | 2/2004 | Gan et al. | 429/218.1 |
| 7,018,743 | B2 | 3/2006 | Guidi et al. | 429/233 |
| 7,091,156 | B2 | 8/2006 | Hirahara et al. | 502/416 |
| 7,531,274 | B1 | 5/2009 | Roy et al. | 429/233 |
| 7,651,647 | B1 | 1/2010 | Strange et al. | 264/104 |
| 2001/0002387 | A1 | 5/2001 | Tsutsumi et al. | 502/416 |
| 2002/0036883 | A1 | 3/2002 | Noguchi et al. | 361/502 |
| 2002/0048144 | A1 | 4/2002 | Sugo et al. | 361/502 |
| 2006/0048646 | A1 | 3/2006 | Olson et al. | 95/134 |
| 2008/0207442 | A1 | 8/2008 | Pfeifer et al. | 502/416 |
| 2009/0097188 | A1 | 4/2009 | Mitchell | 361/502 |

FOREIGN PATENT DOCUMENTS

| | | |
|---|---|---|
| EP | 0763509 A1 | 3/1996 |
| EP | 0891943 A1 | 11/1997 |
| JP | 5-101980 | 4/1993 |
| JP | 7-201674 | 8/1995 |
| JP | 10-116755 | 5/1998 |
| JP | 2004-67498 | 3/2000 |
| JP | 2004-47613 | 2/2004 |
| JP | 2007-302512 | 11/2007 |

OTHER PUBLICATIONS

Oh, et al., "Preparation and Characteristics of Rice-Straw-Based Porous Carbons With High Adsorption Capacity", Fuel, 81, (2002), pp. 327-336.

Jung, et al., "Nitrogen and Hydrogen Adsorption of Activated Carbon Fibers Modified by Fluorination", Journal of Industrial and Engineering Chemistry, 15, (2009), pp. 410-414.
Illan-Gomez, M.J.; Garcia-Garcia, A.; de Lecea, C.S.-M., and Linares-Solano, A., Activated Carbons from Spanish Coals. 2. Chemical Activation. Energy & Fuels 1996, 10, 1108-14.
Kadlec, O.; Varhanikova, A.; Zukal, A., Structure of Pores of Active Carbons Prepared by Water-Vapour and Zinc-Dichloride Activation. Carbon 1970, 8, 321-331.
Treusch, O.; Hofenauer, A.; Troger, F.; Fromm, J.; Wegener, G., Basic Properties of Specific Wood-based Materials Carbonised in a Nitrogen Atmosphere. Wood Sci Technol (2004) 38: 323-333.
Boehm, H.P., Some Aspects of the Surface Chemistry of Carbon Blacks and Other Carbons. Carbon 1994, 32, (5), 759-769.
Cadek, M.; Oettinger, O.; Wachtler, J.; Raymundo-Pinero, E.; Beguin, F., Bio-Based Materials for Supercapacitor. Carbon 2007.
Raymundo-Pinero, E.; Cadek, M; Beguin, F., Tuning Carbon Materials for Supercapacitors by Direct Pyrolysis of Seaweeds. Advanced Functional Materials 2009, 19, 1032-1039.
Yue, et al "Preparation of fibrous porous materials by chemical activation 1. $Zncl_2$ activation of polymer-coated fibers", Carbon 40 (2002) 1181-1191.
Teng, et al "Peparation of porous carbons from phenol-formaldehyde resins with chemical and physical activation", Carbon 38 (2000) 817-824.
Yue, et al "Preparation of fibrous porous materials by chemical activation 2. $H_3PO_4$ activation of polymer-coated fibers", Carbon 40 (2002) 1181-1191.
Pandolfo, et al "Carbon properties and their role in supercapacitors", Journal of Power Sources, 157 (2006) 11-27.
Ahmadpour, et al "The Preparation of Active Carbons From Coal by Chemial and Physical Activation" Carbon, vol. 34, No. 4, pp. 471-479 1996.
Ahmadpour, et al "The Preparation of Activated Carbon From Macadamia Nutshell by Chemical Activation", Carbon vol. 35, No. 12, pp. 1723-1732 1997.
Tennison, et al "Phenolic-resin-derived activated carbons", Applied Catalysis A: General 1973 (1998) 289-311.
Lee, et al "The adsorption properties of surface modified activated carbon fibers for hydrogen storages" Catalysis Today 120 (2007) 420-425.
Nanse, et al "Fluorination of carbon blacks. An X-Ray photoelectron spectroscopy study. Part II XPS study of a furnace carbon black . . ." Carbon vol. 35, pp. 371-388 1997.

*Primary Examiner* — Stuart Hendrickson
(74) *Attorney, Agent, or Firm* — Michael W. Russell

(57) ABSTRACT

A method for producing a halogenated activated carbon material includes heating a natural, non-lignocellulosic carbon precursor in an inert or reducing atmosphere to form a first carbon material, mixing the first carbon material with an inorganic compound to form a mixture, heating the mixture in an inert or reducing atmosphere to incorporate the inorganic compound into the first carbon material, removing the inorganic compound from the first carbon material to produce an activated carbon material, and treating the activated carbon material with a halogen source to form a halogenated activated carbon material. The halogenated activated carbon material is suitable to form improved carbon-based electrodes for use in high energy density devices.

17 Claims, No Drawings

HALOGENATED ACTIVATED CARBON MATERIALS FOR HIGH ENERGY DENSITY ULTRACAPACITORS

BACKGROUND AND SUMMARY

The present disclosure relates to halogenated activated carbon materials, and to methods for preparing such materials. The halogenated activated carbon can have a low oxygen content. The disclosure also relates to high power density energy storage devices comprising halogenated activated carbon.

Energy storage devices such as ultracapacitors may be used in many applications where a discrete power pulse is required. Such applications range from cell phones to hybrid vehicles. An important characteristic of an ultracapacitor is the energy density that it can provide. The energy density of the device, which can comprise two or more carbon-based electrodes separated by a porous separator and/or an organic electrolyte, is largely determined by the properties of the carbon-based electrodes.

Carbon-based electrodes suitable for incorporation into high energy density devices are known. For example, high performance carbon materials, which form the basis of such electrodes, can be made from synthetic phenolic resin precursors. However, due to the high cost of the synthetic resins, the cost of such carbon-based electrodes can be high. Accordingly, it would be an advantage to provide a more economical carbon material that can be used to form carbon-based electrodes that enable higher energy density devices.

According to one aspect of the disclosure, a halogenated activated carbon material that is suitable for incorporation into carbon-based electrodes and for use in ultracapacitors and other high power density energy storage devices is derived from natural non-lignocellulosic materials. By using non-lignocellulosic materials as a precursor for the porous, activated carbon material, economically viable, high power density, high energy density devices can be formed. As defined herein, a "natural, non-lignocellulosic carbon precursor" means at least one natural, non-lignocellulosic carbon precursor.

According to an embodiment, a halogenated activated carbon material is prepared by forming an aqueous mixture of a natural, non-lignocellulosic carbon precursor and an inorganic compound, heating the aqueous mixture in an inert or reducing atmosphere to carbonize the carbon precursor, removing the inorganic compound to produce an activated carbon material, and treating the activated carbon material with a halogen source to form a halogenated activated carbon material.

According to a further embodiment, a halogenated activated carbon material is prepared by heating a natural, non-lignocellulosic carbon precursor in an inert or reducing atmosphere to form a first carbon material, mixing the first carbon material with an inorganic compound to form an aqueous mixture, heating the aqueous mixture in an inert or reducing atmosphere to incorporate the inorganic compound into the first carbon material, removing the inorganic compound from the first carbon material to produce an activated carbon material, and treating the activated carbon material with a halogen source to form a halogenated activated carbon material.

Additional features and advantages of the invention will be set forth in the detailed description which follows, and in part will be readily apparent to those skilled in the art from that description or recognized by practicing the invention as described herein, including the detailed description which follows, as well as the appended claims.

It is to be understood that both the foregoing general description and the following detailed description present embodiments of the invention, and are intended to provide an overview or framework for understanding the nature and character of the invention as it is claimed.

DETAILED DESCRIPTION

A method for producing a halogenated activated carbon material comprises forming an aqueous mixture of a natural, non-lignocellulosic carbon precursor and an inorganic compound, heating the aqueous mixture in an inert or reducing atmosphere to carbonize the carbon precursor, removing the inorganic compound from the carbonized carbon precursor, and treating the activated carbon material with a halogen source to form a halogenated activated carbon material.

A further method for producing a halogenated activated carbon material comprises heating a natural, non-lignocellulosic carbon precursor in an inert or reducing atmosphere to form a first carbon material, mixing the first carbon material with an inorganic compound to form a mixture, heating the mixture to incorporate the inorganic compound into the first carbon material, removing the inorganic compound from the first carbon material, and treating the activated carbon material with a halogen source to form a halogenated activated carbon material. The halogenated activated carbon materials formed according to either of the foregoing methods are suitable to form carbon-based electrodes for use in high energy density devices.

During the mixing, the inorganic compound can be incorporated into the structure of the natural, non-lignocellulosic carbon precursor or into a first carbon material. The inorganic compound can include an alkali hydroxide or chloride (e.g., NaOH, KOH, NaCl, KCl), phosphoric acid, or other suitable salt such as $CaCl_2$ or $ZnCl_2$.

To facilitate mixing, the inorganic compound can be initially dissolved in a liquid such as water. The mixture comprising the inorganic compound is then mixed with the natural, non-lignocellulosic carbon precursor or the first carbon material, and the mixture is optionally allowed to age for an amount of time effective to permit incorporation of the inorganic compound into the natural, non-lignocellulosic carbon precursor or the first carbon material. The mixture can be aged for 0.5, 1, 2, 4, 8 or more hours (e.g., from 0.5 to 8 hours).

The non-lignocellulosic carbon precursor and the inorganic compound can be combined in any suitable ratio. A ratio, expressed in weight percent, of natural, non-lignocellulosic carbon precursor to inorganic compound can range from about 10:1 to 1:10. Non-limiting, exemplary ratios include 9:1, 8:1, 7:1, 6:1, 5:1, 4:1, 3:1, 2:1, 1:1, 1:2, 1:3, 1:4, 1:5, 1:6, 1:7, 1:8 and 1:9. According to one embodiment, the ratio of inorganic compound to natural, non-lignocellulosic carbon precursor is greater than or equal to 1 (e.g., 10:1, 9:1, 8:1, 7:1, 6:1, 5:1, 4:1, 3:1, 2:1 or 1:1).

Similarly, the first carbon material and inorganic compound can be combined in any suitable ratio. A ratio, expressed in weight percent, of natural, non-lignocellulosic carbon precursor to inorganic compound can range from about 10:1 to 1:10 (e.g., 9:1, 8:1, 7:1, 6:1, 5:1, 4:1, 3:1, 2:1, 1:1, 1:2, 1:3, 1:4, 1:5, 1:6, 1:7, 1:8 or 1:9).

In embodiments where the inorganic compound is incorporated into the natural, non-lignocellulosic carbon precursor, the mixture can be heated in an inert or reducing atmosphere at a temperature effective to carbonize the carbon precursor. For example, the mixture can be heated at a temperature from about 600° C. to 900° C. (e.g., 600, 650, 700, 750, 800, 850 or 900° C.) for a predetermined time (e.g., 0.5, 1, 2, 4, 8 or more hours) and then cooled. During the heating step, the natural, non-lignocellulosic carbon precursor decomposes and forms carbon and the inorganic compound is incorporated into the carbon.

In embodiments where the inorganic compound is incorporated into the first carbon material, the mixture is heated at a temperature effective to incorporate the inorganic compound into the first carbon material. The mixture can be heated at a temperature from about 300° C. to 850° C. for a predetermined time (e.g., 0.5, 1, 2, 4, 8, or more hours) and then cooled. The cooled carbon can then be activated.

After cooling, the carbon material (e.g., the first carbon material) having the inorganic compound incorporated therein can be rinsed in a solvent to remove the inorganic compound. A preferred solvent for extracting the inorganic compound is water. Optionally, the extraction solvent can include an acid. One process for removing the inorganic compound involves sequentially rinsing the carbon material with water and acid. A further process for removing the inorganic compound involves rinsing the carbon material with an aqueous acid mixture (e.g., mixture of acid and water). Acids used during the extraction can include hydrochloric acid. The process of extracting the inorganic compound forms a porous, activated carbon material, the pores being defined by the volume previously filled by the inorganic compound.

During carbonization and/or activation, oxygen can be inadvertently incorporated into the carbon (or activated carbon) material. The incorporation of oxygen, especially in the form of oxygen-containing surface functionalities, can adversely affect the properties of energy storage devices that comprise electrodes made from the activated carbon. For example, the presence of oxygen-containing surface functionalities can give rise to pseudocapacitance, increase the self-discharge or leakage rate, cause decomposition of the electrolyte, and/or cause a long term increase in resistance and deterioration of capacitance.

In embodiments, a total oxygen content of the activated carbon (i.e., halogenated activated carbon) is limited to at most 10 wt. %. By total oxygen content is meant the sum of all atomic and molecular oxygen in the carbon, including oxygen in oxygen-containing functional groups in and/or on the carbon material. In further embodiments, the total oxygen content is less than 9, 8, 7, 6, 5, 4, 3, 2 or 1 wt. %.

In one embodiment, following activation, the activated carbon material is subjected to a refining step wherein the activated carbon is heated in an inert or reducing environment to a temperature ranging from, for example, about 450-1000° C., and for a period of, for example, about 0.5-10 hours. Preferably, the environment during the refining step is substantially free of oxygen.

As with the carbonization and activation steps, the heating and cooling rates for the refining step can vary from about 10-600° C./hr. The refining step may be conducted at a temperature that is the same as the temperature used in the carbonization and/or activation steps, or the refining step may be conducted at a temperature that is greater than or less than the carbonization/activation temperature(s).

The refining step advantageously decreases the oxygen content in the activated carbon. In embodiments, the inert or reducing environment used in the refining step can include nitrogen or a mixture of nitrogen and hydrogen where the concentration of hydrogen is maintained below 6%. The refining step is optional. If performed, the refining step precedes a halogenation step.

Halogenation of the activated carbon material can be performed by exposing the activated carbon to a halogen source. Example halogens include fluorine, chlorine, bromine and iodine. Example halogen sources may be gaseous, liquid or plasma-based and include, for example, elemental halogens ($F_2$, $Cl_2$, $Br_2$ and $I_2$) as well as halogen-containing compounds. In addition to the diatomic gases, the halogen source can be a gaseous, halogen-containing compound, or a halogen-based salt or acid (e.g., HF, HCl, HBr, HI), which can be incorporated into an aqueous solution. A further example of a halogen source includes halogen-containing plasma such as $CF_4$ plasma.

The activated carbon material can be exposed to a halogen source by mixing or by otherwise allowing the halogen source to come into contact with the activated carbon. Suitable conditions for halogenation of the activated carbon may comprise controlling one or more of temperature and pressure. Suitable temperatures and pressures can be readily determined by a skilled artisan. Fluorine treatment with $CF_4$ plasma, for example, may be carried out at a temperature ranging from room temperature to about 800° C. Following exposure, excess halogen species can be removed from the carbon by a suitable technique such as filtration or evaporation.

The halogenation step may or may not incorporate a halogen species into the structure of the activated carbon. Without wishing to be bound by theory, the reactive halogens may remove surface groups that otherwise would react with the electrolyte and contribute to high voltage instability.

The halogenated activated carbon material may comprise microporous activated carbon. As defined herein, microscale pores have a pore size of 2 nm or less. Mesoscale pores have a pore size ranging from 2 to 50 nm. Macroscale pores have a pore size greater than 50 nm. In an embodiment, halogenated activated carbon incorporated into a carbon-based electrode comprises a majority of microscale pores. As used herein, the term "microporous carbon" and variants thereof means an activated carbon having a majority (i.e., at least 50%) of microscale pores. A microporous, activated carbon material can comprise greater than 50% microporosity (e.g., greater than 50, 55, 60, 65, 70, 75, 80, 85, 90 or 95% microporosity). The halogenated activated carbon can have a specific surface area greater than about 300 $m^2/g$, i.e., greater than 300, 350, 400, 500 or 1000 $m^2/g$. By way of example, the halogenated activated carbon can have a specific surface area less than 2500 $m^2/g$, i.e., less than 2500, 2000, 1500, 1200 or 1000 $m^2/g$. The halogenated activated carbon can have a total oxygen content of less than 10 wt. %.

In one example embodiment, the halogenated activated carbon comprises pores having a size of up to 1 nm, which provide a combined pore volume of at least 0.3 $cm^3/g$, pores having a size of from 1 nm to 2 nm, which provide a combined pore volume of at least 0.05 $cm^3/g$, and less than 0.15 $cm^3/g$ combined pore volume of any pores having a size of greater than 2 nm.

According to further embodiments, halogenated activated carbon material comprises activated carbon material having a total porosity greater than 0.4 $cm^3/g$ (e.g., greater than 0.4, 0.45, 0.5, 0.55, 0.6, 0.65 or 0.7 $cm^3/g$). The portion of the total pore volume resulting from micropores ($d \leq 2$ nm) can be 95% or greater (e.g., at least 95, 96, 97, 98 or 99%) and the portion of the total pore volume resulting from ultramicropores ($d \leq 1$ nm) can be 60% or greater (e.g., at least 60, 65, 70, 75, 80, 85, 90 or 95%). The pore size distribution of the halogenated activated carbon can include ultramicropores, micropores, mesopores and macropores and may be characterized as having a unimodal, bimodal or multi-modal pore size distribution. The ultramicropores can comprise 0.3 $cm^3/g$ or more (e.g., 0.4 $cm^3/g$ or more) of the total pore volume. Pores having a pore size (d) in the range of $1 < d \leq 2$ nm can comprise 0.05 $cm^3/g$ or more (e.g., at least 0.1, 0.15, 0.2 or 0.25 $cm^3/g$)

of the total pore volume. If present, any pores having a pore size greater than 2 nm, which may include mesopores and/or macropores, can comprise 0.15 $cm^3/g$ or less (e.g., less than 0.1 or 0.04 $cm^3/g$) of the total pore volume.

Once formed the halogenated activated carbon material can be incorporated into a carbon-based electrode. Halogenated activated carbon material can be mixed with carbon black and/or a polymeric binder such as polytetrafluroethylene (PTFE) or other suitable binder and compacted to form the electrode.

By way of example, a carbon paper having a thickness in a range of about 100-300 microns is prepared by rolling and pressing a powder mixture comprising 60-90 wt. % halogenated activated carbon material, 5-20 wt. % carbon black and 5-20 wt. % PTFE. Carbon sheets can be stamped or otherwise patterned from the carbon paper and laminated to a conductive current collector to form an electrode.

The high energy density device can include an ultracapacitor. Ultracapacitors can have a jelly roll design, prismatic design, honeycomb design, or other suitable configuration. A carbon-based electrode made according to the present disclosure can be incorporated into a carbon-carbon ultracapacitor or into a hybrid ultracapacitor. In a carbon-carbon ultracapacitor, both of the electrodes are carbon-based electrodes. In a hybrid ultracapacitor, on the other hand, one of the electrodes is carbon-based, and the other electrode can be a pseudo capacitive material such as lead oxide, ruthenium oxide, nickel hydroxide, manganese oxide, iron oxide, or another material such as a conductive polymer (e.g., parafluorophenyl-thiophene).

Ultracapacitors comprising carbon-based electrodes that include halogenated activated carbon exhibit higher energy densities than is obtained from electrodes derived from commercially-available (non-halogenated) carbon material.

The carbon precursor is a natural non-lignocellulosic material. As defined herein, a substance that contains both cellulose and lignin is lignocellulosic and, for example, can include any of several closely-related substances constituting the essential part of woody cell walls of plants having cellulose intimately associated with lignin. The non-lignocellulosic carbon precursors used in conjunction with the present invention are substantially free of at least one of lignin and cellulose. By substantially free is meant that at least one of the lignin and cellulose comprise, for example, at most 0.5, 1 or 2 wt. % of the composition of the carbon precursor.

In one embodiment, the natural non-lignocellulosic carbon precursor contains cellulose and is substantially free of lignin. In a further embodiment, the natural non-lignocellulosic carbon precursor contains lignin but is substantially free of cellulose. In a still further embodiment, the natural non-lignocellulosic carbon precursor is substantially free of both lignin and cellulose. The natural, non-lignocellulosic carbon precursor is not a synthetic material such as a synthetic resin.

Lignin, which is a Latin word for wood, is a compound that imparts rigidity to a plant. Lignin is a three-dimensional polymer having an amorphous structure and a high molecular weight. Of the three main constituents in plant fibers, lignin has the least affinity for water. In addition, lignin is a thermoplastic (i.e., lignin starts to soften at relatively low temperature and, with increasing temperature, will flow readily).

Cellulose is a basic structural component of plant fibers. Cellulose molecules can comprise, e.g., glucose units that are linked together in long chains, which in turn are linked together in bundles called microfibrils. Hemicelluloses are also found in plant fibers. Hemicelluloses are typically polysaccharides bonded together in relatively short, branching chains. Hemicelluloses, which are usually hydrophilic, are usually intimately associated with the cellulose microfibrils, embedding the cellulose in a matrix.

Typical lignocellulosic fibers from agriculture are found, for example, in straws, hemp, flax, sisal, and jute. On the other hand, non-lignocellulosic fibers are substantially free of lignin and/or cellulose.

The natural, non-lignocellulosic carbon precursor can be derived from an edible grain such as wheat flour, walnut flour, corn flour, corn starch, rice flour, and potato flour. Other natural, non-lignocellulosic carbon precursors include beets, millet, soybean, barley, and cotton. The non-lignocellulosic material can be derived from a crop or plant that may or may not be genetically-engineered.

An exemplary non-lignocellulosic carbon precursor is wheat flour. Wheat flour is derived by milling wheat kernels, which are the seeds of the wheat plant. Wheat kernels have three main parts: the endosperm, the germ, and the bran. Whole wheat flour contains all three parts of the kernel, while white flour is milled from just the endosperm.

Compositionally, white flour contains mostly starch, although additional components are naturally present. The main components in white flour, with approximate percentages provided in parentheses, are starch (68-76%), proteins (6-18%), moisture (11-14%), gums (2-3%), lipids (1-1.5%), ash (<0.5%) and sugars (<0.5%).

Starch makes up the bulk of white flour. Even bread flour, considered "low" in starch, contains more starch than all other components combined. Starch is typically present in flour as small grains or granules. Chunks of protein bind starch granules together and hold them in place within the endosperm. Glutenin and gliadin, the gluten-forming proteins, typically make up about 80 percent of the proteins in the endosperm. Other proteins in white flour include enzymes, such as amylase, protease, and lipase. Other carbohydrates in flour besides starch include gums, specifically pentosan gums. Pentosan gums are a source of soluble dietary fiber. Lipids include oils and emulsifiers, and ash includes inorganic matter (mineral salts), which can comprise iron, copper, potassium, sodium, and zinc.

Disclosed herein are halogenated, electrochemically stable activated carbon materials derived from non-lignocellulosic sources. The activated carbon materials can be characterized by high microporosity and low oxygen content, and can achieve a higher operating voltage in an ultracapacitor device than conventional carbon materials. Such activated carbon materials provide a high specific capacitance and, in turn, high energy storage capacity together with long-term stability in EDLCs.

EXAMPLES

The invention will be further clarified by the following examples.

Example 1

Wheat flour (3000 g) was first carbonized in flowing nitrogen (~60 SLPM) by placing the flour within a furnace that was heated at 150° C./hr to 800° C., and then held at 750° C. for 2 hours. After being ground to a powder, the resulting carbonized precursor was mixed with a KOH solution (45 wt. % in water) in 2:1 (wt./wt.) ratio of carbon:KOH. The mixture was initially dried at 100° C. to form a solid cake. The cake was then heated under flowing nitrogen to 750° C. for 2 hours. The oven was cooled to 100° C., and held at 100° C. for 3 hrs during which time the oven was purged with 13 SLPM of nitrogen saturated with water vapor. The cooled mixture was washed with water and then with dilute HCl to remove potassium and other impurities. Complete elimination of potassium was confirmed by monitoring the pH of the effluent. The activated carbon powder product was dried (125° C. for 18 hours) and ground to a fine powder (~10 micrometers).

Following activation, refining of the activated carbon includes heating the activated carbon at 150° C./hr to a temperature in the range of 650-900° C. under flowing $N_2$ or a mixture of $N_2$ and $H_2$, and then continuing the gas purge while holding at temperature for 2 hours. The furnace is then allowed to cool naturally, and upon cooling to 100° C., the furnace is held at 100° C. for 3 hrs during which time the furnace is purged with 13 SLPM of nitrogen saturated with water vapor. The refined activated carbon can be dried (125° C. for 18 hours).

The activated carbon was halogenated by mixing the activated carbon powder with an aqueous HF (50%) solution under constant agitation and then dried.

Example 2

The BET surface area of the halogenated activated carbon from Example 1 was measured to be 1700 $m^2/g$. Ion chromatography (Dionex ICS3000) was used to measure the fluorine content. Samples were run on Dionex ION Pac AS19 (anion specific) and Dionex ION Pac CS12A (cation specific) columns at a flow rate of 1 ml/min. Prior to HF exposure, the fluorine content was 38 ppm. The fluorine content of the activated carbon after treatment with HF was 724 ppm.

Example 3

Eighty grams of the halogenated activated carbon powder from Example 1 was mixed with 10 grams of carbon black and 10 grams of PTFE to obtain a well-mixed mass. This mixture was combined with isopropyl alcohol and then rolled on a roll mill to obtain a well-knit film having a thickness of about ~100 micrometers. Carbon-based electrodes were produced by stamping the thin film.

The electrodes were dried overnight at 120° C. and then soaked in 1.5 M tetraethylammonium-tetrafluoroborate (TEA-TFB) in acetonitrile. A porous separator was also soaked in the electrolyte solution and an electrode/separator/electrode stack was assembled into a button cell with opposing platinum foil current collectors. The separator used was cellulose paper.

Electrochemical experiments were used to test the cell, included cyclic voltammetry (CV), electrochemical impedance spectroscopy (EIS) and galvanostatic charge/discharge. Cyclic voltammetry experiments were performed at a scan rate of 2 mV/sec within various potential windows over the maximum range of 0 to 4.0 V. The EIS test included measuring impedance while applying an AC perturbation with an amplitude of 10 mV at a constant DC voltage of 0 V over the frequency range of 0.01-10,000 Hz. Galvanostatic charge/discharge experiments were performed at a current magnitude of 10 mA.

The capacitance of the device was calculated using the Integrated Energy Method. The galvanostatic data (potential vs. time data) was numerically integrated and multiplied by the discharge current to obtain the energy delivered by the device (in Ws) between two potentials $V_1$ and $V_2$.

$$E = I_{disch} * \int_{V1}^{V2} V dt$$

The device capacitance ($C_{device}$ in Farads) can be calculated from the energy according to the following relationship:

$$C_{device} = \frac{2E}{(V_1^2 - V_2^2)}$$

The specific capacitance ($F/cm^3$) was then calculated by dividing the device capacitance by the total volume of the carbon electrodes.

The stable voltage, which is the maximum voltage the device can withstand without appreciable Faradaic reactions, was measured from a series of cyclic voltammetry (CV) experiments performed over several different voltage windows. From the CV data, a Faradaic Fraction was measured using the following equation:

$$\text{Faradaic Fraction} = \frac{Q_{Faradaic}}{Q_{non-Faradaic}} = \frac{(Q_{anodic} - Q_{cathodic})}{Q_{cathodic}}$$

The charge (Q) during anodic and cathodic scans was calculated by integrating the CV curve and dividing the result by the scan rate at which the CV was performed. The stable voltage was defined as the potential at which the Faradaic Fraction is approximately 0.1.

The energy density at the stable voltage, which is the maximum voltage the device can withstand without appreciable Faradaic reactions, was calculated using the following relation where $C_{device}$ is the device capacitance (in Farads), $V_1$ is the stable voltage, $V_2$ is $V_1/2$, and Volume is the device volume in liters:

$$\text{Energy density (Wh/L)} = \frac{1}{2} C_{device}(V_1^2 - V_2^2) \frac{3600}{\text{Volume}}$$

The button cell device prepared as disclosed above showed an operating voltage of 3V and an energy density of 17.3 Wh/l.

Example 2 (Comparative)

A comparative button cell device was made using the activated carbon preparation method of Example 1, except the halogenation step was omitted. The comparative device showed an operating voltage of 2.8 V and an energy density of 15.1 Wh/l.

Example 3

The experiment of example 1 was repeated using an electrolyte comprising 1.5M TEA-TFB in a solvent mixture of 25:75 ethylene carbonate:acetonitrile. The resulting button cell device showed a stable operating voltage of 3.2 V and an energy density of 26 Wh/l.

Example 4

The experiment of example 3 was repeated but with first treating the carbon in HF at 75° C. The fluoride content of the carbon was 4671 ppm. The stable voltage observed in this case was 3.4V with energy density of 29 Wh/l.

Example 5 (Comparative)

Wheat flour was heated in flowing nitrogen initially at 500° C. for 5 hours, and then at 1000° C. for 5 additional hours. After cooling in nitrogen to room temperature, the carbon material was treated in 46% HF overnight, washed with water and ethyl alcohol until the effluent pH was about 7, and then dried.

The BET surface of this un-activated carbon was 117 m$^2$/g, and the fluoride content was 1589 ppm. The carbon was evaluated for performance via the button cell procedure described in example 1, which revealed an energy density of 1.64 Wh/l. The low energy density, in spite of the high fluorine content, suggests the importance of high surface area for high performance.

Example 6 (Comparative)

The carbon of Example 5 was heated in air at 900° C. for two hours, which resulted in complete burnout of the carbon.

Without wishing to be bound by theory, it is believed that a high energy density, high power density device can be prepared from halogenated, activated carbon-based electrodes that possess both an effective surface area and fluorine content.

As used herein, the singular forms "a," "an" and "the" include plural referents unless the context clearly dictates otherwise. Thus, for example, reference to a "non-lignocellulosic material" includes examples having two or more such "materials" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for producing a halogenated activated carbon material comprising:
   heating a natural, non-lignocellulosic carbon precursor in an inert or reducing atmosphere to form a first carbon material;
   mixing the first carbon material with an inorganic compound to form a mixture;
   heating the mixture in an inert or reducing atmosphere to incorporate the inorganic compound into the first carbon material;
   removing the inorganic compound from the first carbon material to produce an activated carbon material; and
   treating the activated carbon material with a halogen source to form a halogenated activated carbon material.

2. A method according to claim 1, wherein the non-lignocellulosic carbon precursor is selected from the group consisting of wheat flour, walnut flour, corn flour, rice flour, potato flour, almond shells, coffee grounds, potatoes, beets, millet, soybean, rape, barley and cotton.

3. A method according to claim 1, wherein the inorganic compound is selected from the group consisting of an alkali hydroxide, alkali chloride, phosphoric acid, calcium chloride and zinc chloride.

4. A method according to claim 1, wherein the inorganic compound is selected from the group consisting of sodium hydroxide, potassium hydroxide, sodium chloride and potassium chloride.

5. A method according to claim 1, wherein a weight ratio of inorganic compound to non-lignocellulosic carbon precursor in the aqueous mixture is between about 5:1 and 1:5.

6. A method according to claim 1, wherein a weight ratio of inorganic compound to non-lignocellulosic carbon precursor in the aqueous mixture is greater than or equal to 7.

7. A method according to claim 1, further comprising aging the aqueous mixture for an aging time ranging from between about 0.5 to 8 hours prior to the step of heating.

8. A method according to claim 1, wherein the step of heating comprising heating the mixture at a temperature in a range of about 300° C. to 850° C.

9. A method according to claim 1, wherein the step of removing the inorganic compound comprises rinsing the first carbon material in a solvent.

10. A method according to claim 9, wherein the solvent is water.

11. A method according to claim 1, further comprising heating the activated carbon material in an inert or reducing atmosphere at a temperature in a range of about 450-1000° C. prior to treating the activated carbon material with the halogen source.

12. A method according to claim 1, wherein the halogen source is selected from the group consisting of liquid, gas and plasma.

13. A method according to claim 1, wherein the halogen source comprises an aqueous solution of HF.

14. A method according to claim 1, wherein the halogen source comprises a gas selected from the group consisting of $F_2$ and $CF_4$.

15. A method for producing a halogenated activated carbon material comprising:
   forming an aqueous mixture of a natural, non-lignocellulosic carbon precursor and an inorganic compound;
   heating the aqueous mixture in an inert or reducing atmosphere to form a first carbon material;
   removing the inorganic compound from the first carbon material to produce an activated carbon material; and
   treating the activated carbon material with a halogen source to form a halogenated activated carbon material.

16. A method according to claim 15, further comprising aging the mixture for an aging time ranging from between about 0.5 to 8 hours prior to the step of heating the mixture.

17. A method according to claim 15, wherein the step of heating the mixture comprising heating at a temperature in a range of about 600° C. to 900° C.

* * * * *

UNITED STATES PATENT AND TRADEMARK OFFICE
CERTIFICATE OF CORRECTION

PATENT NO.      : 8,198,210 B2
APPLICATION NO. : 12/788478
DATED           : June 12, 2012
INVENTOR(S)     : Kishor Purushottam Gadkaree et al.

Page 1 of 1

It is certified that error appears in the above-identified patent and that said Letters Patent is hereby corrected as shown below:

| *No.* | *Col.* | *Line* | *Description* |
|---|---|---|---|
| 1 | 10 | 24 | Reads "In the aqueous mixture is greater than or equal to 7" should read "In the aqueous mixture is greater than or equal to 1" |

Signed and Sealed this
Twenty-eighth Day of August, 2012

David J. Kappos
*Director of the United States Patent and Trademark Office*